United States Patent
Koo et al.

(10) Patent No.: US 9,326,170 B2
(45) Date of Patent: Apr. 26, 2016

(54) WIRELESS LOCAL AREA NETWORK SYSTEM AND METHOD OF OPERATING THE SAME

(71) Applicants: SAMSUNG ELECTRONICS CO., LTD., Suwon-si, Gyeonggi-do (KR); SEOUL NATIONAL UNIVERSITY R&DB FOUNDATION, Seoul (KR)

(72) Inventors: Ji-Hun Koo, Hwaseong-si (KR); Chang-Won Nam, Seoul (KR); Sae-Woong Bahk, Seoul (KR)

(73) Assignees: SAMSUNG ELECTRONICS CO., LTD., Suwon-Si, Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 167 days.

(21) Appl. No.: 14/074,822

(22) Filed: Nov. 8, 2013

(65) Prior Publication Data

US 2015/0023187 A1 Jan. 22, 2015

(30) Foreign Application Priority Data

Jul. 17, 2013 (KR) .................. 10-2013-0084232

(51) Int. Cl.
*H04L 1/00* (2006.01)
*H04W 24/08* (2009.01)
*H04W 74/08* (2009.01)

(52) U.S. Cl.
CPC ............ *H04W 24/08* (2013.01); *H04W 74/085* (2013.01); *H04W 74/0808* (2013.01)

(58) Field of Classification Search
CPC .................. H04J 3/10; H04J 3/11; H04J 3/12; H04J 3/13; H04L 47/10; H04L 47/11; H04L 47/12; H04L 47/13; H04L 47/14
USPC .......... 370/252, 201, 203–208, 229, 230, 235
See application file for complete search history.

(56) References Cited

U.S. PATENT DOCUMENTS

| 8,014,360 | B2 | 9/2011 | Kim et al. |
| 8,208,439 | B2 | 6/2012 | Hottinen et al. |
| 2007/0258366 | A1 * | 11/2007 | Imamura ...................... 370/230 |

(Continued)

FOREIGN PATENT DOCUMENTS

JP  2011-035828  2/2011
KR  1020110035503  4/2011

OTHER PUBLICATIONS

Peng Xuan Zheng, et al. "Multipacket Reception in Wireless Local Area Networks", IEEE ICC 2006 proceedings, pp. 3670-3675.

(Continued)

*Primary Examiner* — Dady Chery
(74) *Attorney, Agent, or Firm* — F. Chau & Associates, LLC

(57) ABSTRACT

A method of operating a wireless local area network (WLAN) system is provided. The WLAN includes an access point supporting uplink multiple user multiple input multiple output mode. The method of operating the WLAN system includes selecting a first station, receiving channel information from the selected first station by a second station, calculating a SNR reduction value based on the channel information by the second station, and selecting the second station based on the SNR reduction value.

16 Claims, 14 Drawing Sheets

(56) References Cited

U.S. PATENT DOCUMENTS

2009/0296648 A1    12/2009   Hottinen et al.
2012/0082200 A1    4/2012   Verikoukis et al.

OTHER PUBLICATIONS

Wei-Liang Shen et al., "Rate Adaptation for 802.11 Multiuser MIMO Networks", MobiCom '12, Aug. 22-26, 2012, Istanbul, Turkey, pp. 29-39.

Elli Kartsakli et al., "A Threshold-Selective Multiuser Downlink MAC Scheme for 802.11n Wireless Networks" IEEE Transactions on Wireless Communications, vol. 10, No. 3, Mar. 2011, pp. 857-867.

Kun Tan et al., "SAM: Enabling Practical Spatial Multiple Access in Wireless LAN", MobiCom '09, Sep. 20-25, 2009, Beijing, China, pp. 49-60.

* cited by examiner $\Delta SNR = SNR_{orig} - SNR_{proj}$

| Stage # | Threshold range |
|---|---|
| STG_1 | $0 \leq \Delta SNR < 0.1$ |
| STG_2 | $0.1 \leq \Delta SNR < 0.2$ |
| STG_3 | $0.2 \leq \Delta SNR < 0.3$ |
| STG_4 | $0.3 \leq \Delta SNR < 0.4$ |
| STG_5 | $0.4 \leq \Delta SNR < 0.5$ |
| STG_6 | $0.5 \leq \Delta SNR < 0.6$ |
| ⋮ | ⋮ |
| STG_K | $TH_{k,lower} \leq \Delta SNR < TH_{k,upper}$ |

FIG. 7A

|      | 1st Backoff Counter Value |
|------|---------------------------|
| STA1 | 2                         |
| STA2 | 7                         |
| STA3 | 9                         |
| STA4 | 3                         |

FIG. 7B

|      | 1st Backoff Counter Value |
|------|---------------------------|
| STA1 | 1                         |
| STA2 | 6                         |
| STA3 | 8                         |
| STA4 | 2                         |

FIG. 7C

|      | 1st Backoff Counter Value |
|------|---------------------------|
| STA1 | 0 |
| STA2 | 5 |
| STA3 | 7 |
| STA4 | 1 |

FIG. 7D

|      | 1st Backoff Counter Value |
|------|---------------------------|
| STA1 | 4 |
| STA2 | 5 |
| STA3 | 7 |
| STA4 | 1 |

FIG. 8A

| | 2nd Backoff Counter Value |
|---|---|
| STA2 | 3 |
| STA3 | 6 |

FIG. 8B

| | 2nd Backoff Counter Value |
|---|---|
| STA2 | 2 |
| STA3 | 5 |

FIG. 8C

|  | 2nd Backoff Counter Value |
|---|---|
| STA2 | 1 |
| STA3 | 4 |

FIG. 8D

|  | 2nd Backoff Counter Value |
|---|---|
| STA2 | 0 |
| STA3 | 3 |

FIG. 8E

| | 2nd Backoff Counter Value |
|---|---|
| STA1 | 0 |
| STA2 | 0 |
| STA3 | 0 |
| STA4 | 0 |

WIRELESS LOCAL AREA NETWORK SYSTEM AND METHOD OF OPERATING THE SAME

CROSS-REFERENCE TO RELATED APPLICATION

This application claims priority under 35 U.S.C. §119 to Korean Patent Application No. 10-2013-0084232, filed on Jul. 17, 2013, in Korean Intellectual Property Office, the disclosure of which is incorporated by reference in its entirety herein.

TECHNICAL FIELD

The inventive concept relates to a wireless local area network (WLAN) system, and particularly, to a WLAN system for supporting an uplink multiple user multiple input multiple output (MU-MIMO), and a method of operating the WLAN system for supporting the MU-MIMO mode.

DISCUSSION OF RELATED ART

A network mode of a wireless local area network (WLAN) may include an infrastructure mode or an Ad Hoc mode depending on whether an access point (AP) exists or not. The infrastructure mode may include an AP which communicates with a plurality of stations. In the Ad Hoc mode, there may be no AP in the WLAN and each station may communicate to each other.

The WLAN may use an orthogonal frequency division multiplexing (OFDM) for physical layer, and a distributed coordination function (DCF) based on carrier sense multiple access with collision avoidance (CSMA/CA) and a point coordination function (PCF) based on scheduling for medium access control layer.

Maximum throughput provided by the WLAN has been increased to 54 Mbps in 802.11a/g, 600 Mbps in 802.11n, and 6.933 Gbps in 802.11ac. The introduction of multiple input multiple output (MIMO) technology contributed to the increase of the throughput. In 802.11n, single user multiple input multiple output (SU-MIMO) technology was adopted as an Institute of Electrical and Electronics Engineerings (IEEE) standard. The SU-MIMO may simultaneously transmit at most four streams to single user. In 802.11ac, multiple user multiple input multiple output (MU-MIMO) technology has been introduced. The MU-MIMO may simultaneously transmit at most eight streams for multiple users. The MU-MIMO may allow the maximum throughput of 6.933 Gbps by transmitting eight streams in a channel having a bandwidth of 160 MHz.

The DCF may be used as a media access control layer (MAC) layer for the WLAN. The DCF may use carrier sensing to determine channel use by contention among the stations. The DCF is a method which excludes scheduling by the AP and determines the channel use among the stations in a distributive manner (e.g., by each station). A station may monitor status of a wireless channel, when the wireless channel is not used during a unit time, the station may decrease a backoff counter value of the station and may transmit through the channel when the backoff counter value of the station becomes 0.

SUMMARY

According to an embodiment of the present inventive concept, a method of operating a wireless local area network (WLAN) system is provided. The WLAN includes an access point (AP) with at least two antennas supporting uplink multiple user multiple input multiple output (UL MU-MIMO) mode. The method includes selecting a first station, receiving a channel information from the selected first station by a second station, calculating a SNR reduction value by using the channel information by the second station, and selecting the second station based on the SNR reducing value.

In an embodiment, the selecting of the first station may include selecting respective first backoff counter values by the respective first station and second station and selecting the first station based on the selected first backoff counter value.

In an embodiment, the selecting of the first station based on the first backoff counter value may include reducing the respective first backoff counter values of the respective first station and second station by one whenever a timeslot is progressed until one of the first backoff counter values of the respective first station and second station is 0, and selecting the station in which the first backoff counter value is 0 as the first station.

In an embodiment, the selecting of the first station may include executing carrier sense multiple access (CSMA).

In an embodiment, the receiving of the channel information from the selected first station by the second station may include receiving a channel vector information of the first station.

In an embodiment, the calculating of the SNR reduction value based on the channel information by the second station may include calculating a difference between an original SNR and a projected SNR. The original SNR may be an SNR before a channel vector of the second station is projected to the orthogonal direction with respect to a channel vector of the first station. The projected SNR may be an SNR after the channel vector of the second station is projected to the orthogonal direction with respect to the channel vector of the first station.

In an embodiment, the selecting of the second station may include comparing the SNR reduction values of respective stations including the second station, capable of accessing to the AP, with respective threshold ranges predetermined differently according to respective stages in a contention round, determining at least one station including the second station whose SNR reduction value falls within a lowest threshold range corresponding to a lowest stage, selecting respective second backoff counter values by the at least one station including the second station in the determined lowest stage, and selecting, based on the selected second backoff counter value, the second station from among the at least one station including the second station.

In an embodiment, the selecting of the second station based on the selected second backoff counter value may include reducing the second backoff counter value by one whenever a timeslot is progressed until one of the second backoff counter values of the at least one station including the second station is 0 and selecting the station whose second backoff counter value is 0 as the second station.

In an embodiment, the method may further include monitoring a network status, determining whether the network status is changed, changing a parameter based on the determined result whether the network status is changed, and broadcasting the changed parameter to at least one station which can access to the AP.

In an embodiment, the network status may be the number of the stations capable of accessing to the AP or channel status of the stations capable of accessing to the AP.

In an embodiment, the changing of the parameter may include changing information related to the threshold predetermined differently according to the stages and the number of the timeslots in the stage.

According to an embodiment of the present inventive concept, a wireless local area network (WLAN) system is provided. The WLAN includes an access point (AP), a first station, and a second station. The AP is configured to support uplink multiple user multiple input multiple output (UL MU-MIMO) and to include at least two antennas. The first station is selected for uplink transmission in a first round contention. The second station is configured to calculate a SNR reduction value by using a channel vector of the first station, and selectively participate in another round contention. The AP is configured to monitor a network status, change a parameter when the network status is changed, and broadcast the parameter.

In an embodiment, the SNR reduction value may be a difference between an original SNR and a projected SNR. The original SNR may be before a channel vector of the second station is projected to the orthogonal direction with respect to a channel vector of the first station. The projected SNR may be after the channel vector of the second station is projected to the orthogonal direction with respect to the channel vector of the first station.

In an embodiment, the second station may determine a throughput of the second station by considering the SNR reduction value of the second station.

In an embodiment, the second station may adjust a data packet length with the second station to match a transmission time of the first station with a transmission time of the second station.

According to an embodiment of the present inventive concept, a method for operating a wireless local area network system supporting uplink multiple user multiple input multiple output mode is provided. The method includes receiving, by a station, a channel information of another station selected in a first round contention, calculating a SNR reduction value by using the channel information by the station receiving the channel information, participating in a second round contention based on the SNR reduction value.

In an embodiment, the method may further include electing the second station based on a second backoff counter value of the second station.

In an embodiment, the channel information from another station may be a channel vector information of another station.

In an embodiment, the first round contention may be carrier sense multiple access and the second round contention is carrier counting multiple access.

In an embodiment, the SNR reduction value, may be a difference between an original SNR before a channel vector of the station receiving the channel information of another station is projected to the orthogonal direction with respect to a channel vector of the another station and a projected SNR after the channel vector of the station receiving the channel information of another station is projected to the orthogonal direction with respect to the channel vector of the another station.

BRIEF DESCRIPTION OF THE DRAWINGS

The foregoing and other features of the inventive concepts will be apparent from the following detailed description of preferred embodiments of the inventive concepts, as illustrated in the accompanying drawings in which

FIGS. 7A to 7D are tables illustrating a first backoff counter value varying during the first round contention process shown in FIG. 6;

FIGS. 8A to 8E are tables illustrating a second backoff counter value varying during the second round contention process shown in FIG. 6;

DETAILED DESCRIPTION OF THE EMBODIMENTS

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention.

The terminology used herein to describe embodiments of the invention is not intended to limit the scope of the invention. The articles "a," "an," and "the" are singular in that they have a single referent, however the use of the singular form in the present document should not preclude the presence of more than one referent.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Figure 1A:
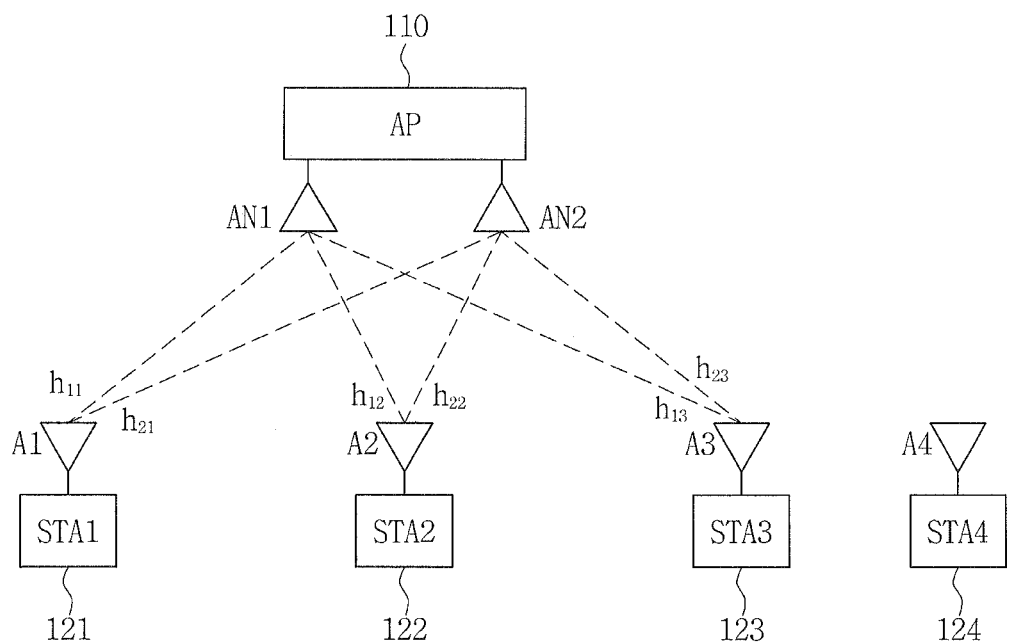
FIGS. 1A and 1B are block diagrams illustrating a wireless local area network (WLAN) system according to an embodiment of the present inventive concept.
Figure 1B:
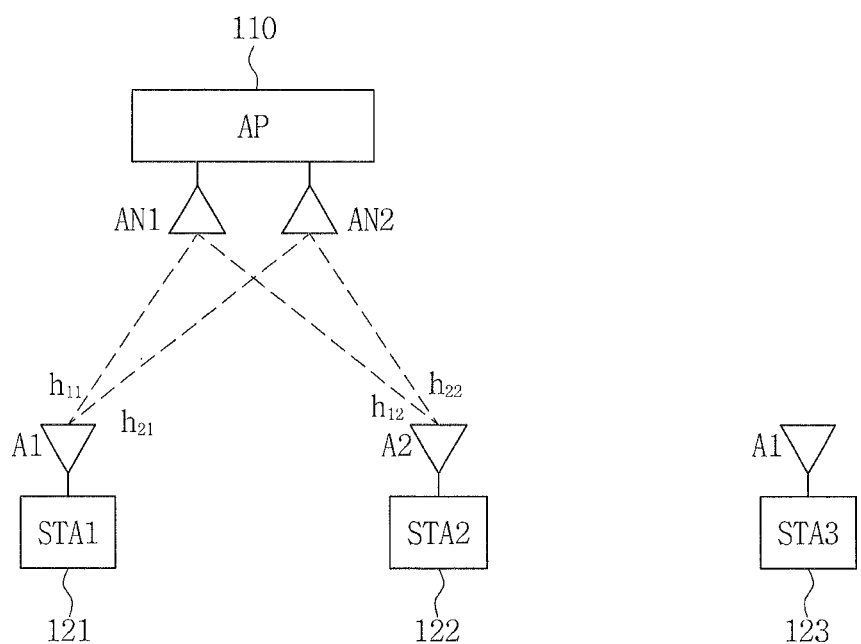

FIGS. 1A and 1B are block diagrams illustrating a wireless local area network (WLAN) system according to an embodiment of the present inventive concept.

Referring to FIG. 1A, a WLAN system 100 according to an embodiment of the inventive concept may support uplink multiple user multiple input multiple output (UL MU-MIMO).

The WLAN system 100 may include an access point (AP) 110 supporting the UL MU-MIMO, a first station (STA1) 121, a second station (STA2) 122, and a third station (STA3) 123. The WLAN system 100 may include a fourth station (STA4) 124 which is not connected to the access point 110.

The respective first station 121 to fourth station 124 may include respective antennas A1 to A4. The access point 110 may include a first antenna AN1 and a second antenna AN2. However, the number of antennas for access point 110 is not limited thereto.

Referring to FIG. 1B, the first station 121 may communicate with the AP 110. Among other stations capable of accessing to the AP 100, a station whose channel vector is the most orthogonal with respect to the channel vector of the first station 121 may communicate with the AP 110 simultaneously with the first station 121. The channel vector of the first station 121 may be transmitted by the first station 121 as a channel information. For example, when a channel vector of the second station 122 is more orthogonal than that of the third station 123, assuming that the third station 123 is only a station accessing to the AP 110 other than the first station 121 and the second station 122, the second station 122 may communicate with the AP 110 together with the first station 121. A method of operating the WLAN system 100 according to the inventive concept will be explained in detail with reference to FIG. 5A to FIG. 7.

Figure 2A:
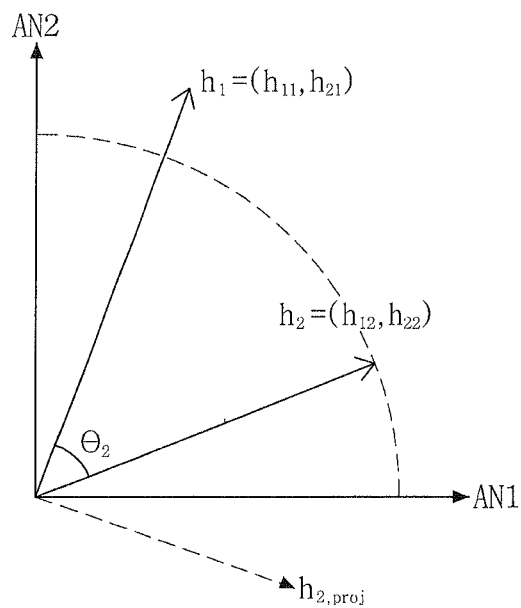
FIG. 2A illustrates channel vectors of a first station and a second station of FIG. 1A
Figure 2B:
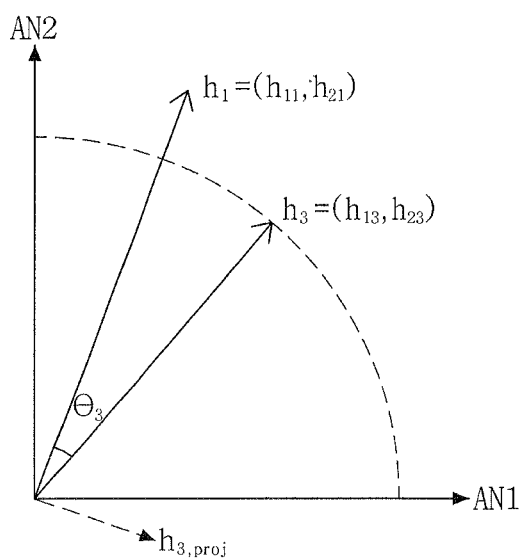
FIG. 2B illustrates channel vectors of the first station and a third station of FIG. 1B.

FIG. 2A illustrates a channel vector of the second station shown in FIG. 1A, and FIG. 2B illustrates a channel vector of the third station shown in FIG. 1B.

Referring to FIG. 1A to FIG. 2B, the AP 110 may use zero forcing successive interference cancellation (ZF-SIC) for decoding a signal transmitted in the UL MU-MIMO mode. An operational principle of the ZF-SIC may be explained on the assumption that the first station 121 and second station 122 simultaneously communicate with the AP 110. A first channel vector $h_1$ between the AP 110 and the first station 121 and a second channel vector $h_2$ between the AP 110 and the second station 122 may be represented by $h_1=(h_{11},h_{11},h_{21})$ and $h_2=(h_{12},h_{22})$, respectively. The first channel vector $h_1$ may be a channel vector between the AP 110 and the first station 121. The second channel vector $h_2$ may be a channel vector between the AP 110 and the second station 122.

Referring to FIGS. 1B and 2A where the first station 121 and the second station 122 are connected to the AP 110, the AP 110 may project signals received from the first station 121 and the second station 122 to the orthogonal direction with respect to the first channel vector $h_1$. The signal received from the first station 121 may be offset and disappeared. The signal received from the second station 122 may be remained.

The signal of the second station 122 which is projected with respect to the first channel vector $h_1$ might not be the same as the signal before being projected. The second channel vector $h_2$ may be projected to be a second projected channel vector $h_{2,proj}$. A signal-to-noise ratio (SNR) of the signal received from the second station 122, before being projected, may be $|h_2|^2 P/N_o$, $SNR_{orig}$. The SNR of the signal received from the second station 122, after being projected, may be $|h_{2,proj}|^2 P/N_o$, $SNR_{proj}$. Here, P and $N_o$ may mean a transmission power and a noise power, respectively. Since $|h_{2,proj}|$ is smaller than $|h_2|$, the $SNR_{proj}$ of the second station 122 may be smaller than the $SNR_{orig}$ of the second station 122. The SNR of the signal received from the second station 122 may be reduced after being projected, as follows:

$$SNR_{proj}=\sin^2(\theta)SNR_{orig},$$

where θ represents an angle between the first channel vector $h_1$ and the second channel vector $h_2$.

A SNR difference before and after being projected, referred to as SNR reduction value ΔSNR, may be $SNR_{orig}-SNR_{proj}$. The SNR reduction value ΔSNR in log scale may be $20 \log_{10} \sin(\theta)$. As the second channel vector $h_2$ gets closer to an orthogonal direction with respect to the first channel vector h1 (i.e., as the angle θ between the first channel vector $h_1$ and the second channel vector $h_2$ gets closer to 90 degree), the SNR reduction value ΔSNR of the signal received from the second station 122 may become lowered. After the AP 110 project the signals received from the first station 121 and the second station 122 to the orthogonal direction with respect to the first channel vector $h_1$, the AP 110 may decode the projected signal of the second station 122. The AP 110 may again encode the projected and decoded signal of the second station 122 by using the second channel vector $h_2$ of the second station 122. The AP may remove the encoded signal of the second station 122 out from the signal of the first station 121. The AP 110 may decode the signal of the first station 121 with no signal from other stations.

Referring to FIG. 1A to FIG. 2B, when the first station 121 performs uplink transmission at a throughput $R_1$, there may exist the second station 122 and the third station 123 which can simultaneously communicate with the AP 110. The AP 110 may project a signal received from the second station 122 or third station 123 to the orthogonal direction with respect to the first channel vector $h_1$ of the first station 121 as long as the second station 122 or the third station 123 communicates with the AP 110. The AP 110 may decode the projected signals of the second station 122 and the third station 123. The AP 110 may encode the projected and decoded signal of the second station 122 or the third station 123 by using the second channel vector $h_2$ of the second station 122 or the third channel vector $h_3$ of the third station 123, respectively. The AP may remove the encoded signal of the second station 122 or the third station 123 out from the signal of the first station 121. The AP 110 may decode the signal of the first station 121 with no signal from other stations. In this case, the SNR reduction values of the second 122 and third station 123 may be determined by $\theta_2$ and $\theta_3$, respectively. When $\theta_2$ is larger than $\theta_3$, the SNR reduction value ΔSNR2 of the second station 122 may be smaller than the SNR reduction value ΔSNR3 of the third station 123.

Before being projected to the orthogonal direction with respect to the channel vector $h_1$ of the first station 121, both the second station 122 and the third station 123 may have the same SNR, $SNR_{orig}$ assuming that the second channel vector $h_2$ and a third channel vector $h_3$ are located on a concentric circle.

After being projected to the orthogonal direction with respect to the channel vector $h_1$ of the first station 121, the SNR of the projected signal, $SNR_{2,proj}$, of the second station 122 may be larger than the SNR of the projected signal, $SNR_{3,proj}$, of the third station 123 when $\theta_2$ is larger than $\theta_3$, as represented by $SNR_{2,proj} > SNR_{3,proj}$. As a SNR is increased, a throughput may be increased. For example, the throughput $R_2$ of the second station 122 be higher than the throughput $R_3$ of the third station 123. The summation of both $R_1$ and $R_2$ represented by a whole system throughput, may be larger than the summation of $R_1$ and $R_3$. The whole system throughput in the WLAN 100 may be increased as channel vectors of the stations transmitting UL signals simultaneously are closer to be orthogonal to each other.

Figure 3:
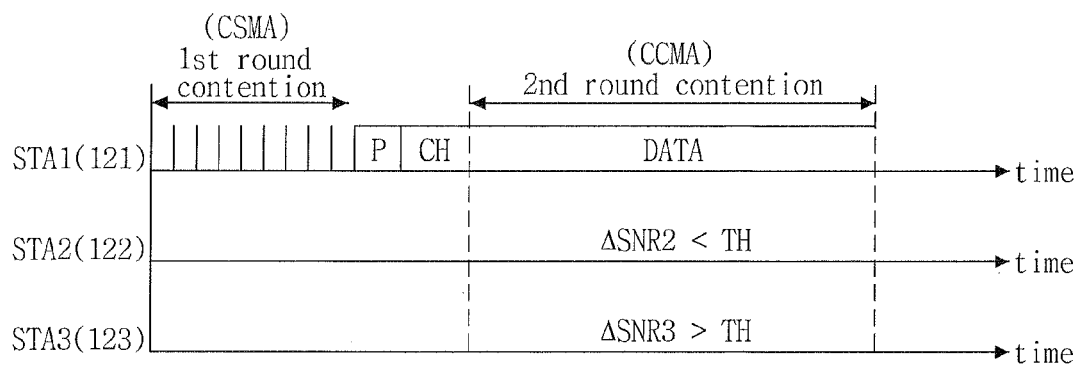
FIG. 3 is a conceptual diagram illustrating an operation of the WLAN system shown in FIG. 1A.

FIG. 3 is a conceptual diagram illustrating an operation of the WLAN system shown in FIG. 1A.

Referring to FIG. 1A to FIG. 3, it is assumed that the first station 121 to the third station 123 are located in a distance to access to the AP 110. It is assumed that the first station 121 wins in a first round contention and then first accesses the AP 110. Since the AP 110 has the first and second antennas AN1 and AN2, the AP 110 may simultaneously communicate with two stations. The second station 122 and the third station 123 may participate in a second round contention. The first round contention may be performed by a carrier sense multiple access (CSMA). The second round contention may be performed a carrier counting multiple access (CCMA).

The first station 121 may transmit a preamble P and the channel information CH of the first station 121 to the AP 110, the second station 122, or the third station 123. The second station 122 and third station 123 may receive the preamble P and the channel information CH of the first station 121. The channel information may be a channel vector between the first station 121 and the AP 110.

The second station 122 may calculate the SNR reduction value ΔSNR2 of the second station 122 by using the channel information of the second station 122 and the channel information CH of the first station 121. The second station 122 may compare the SNR reduction value ΔSNR2 of the second station 122 with a predefined threshold TH. The threshold TH may be an upper bound of the SNR reduction value for participating in the second round contention. The threshold TH may be set to have an appropriate value. The appropriate value of the threshold TH may be obtained based on a simulation result for the WLAN system 100. For example, if the SNR reduction value ΔSNR2 of the second station 122 is smaller than the threshold TH, the second station 122 may participate in the second round contention.

The third station 123 may calculate the SNR reduction value ΔSNR3 of the third station 123 by using the channel information of the third station 123 and the channel information CH of the first station 121. The third station 123 may compare the SNR reduction value ΔSNR3 of the third station 123 with the predefined threshold TH. For example, if the SNR reduction value ΔSNR3 of the third station 123 is larger than the threshold TH, the third station 123 might not participate in the second round contention, and may be remained at a stand-by status. The second round contention according to an embodiment of the inventive concept will be explained in detail with reference to FIG. 5A and FIG. 5B.

Figure 4:
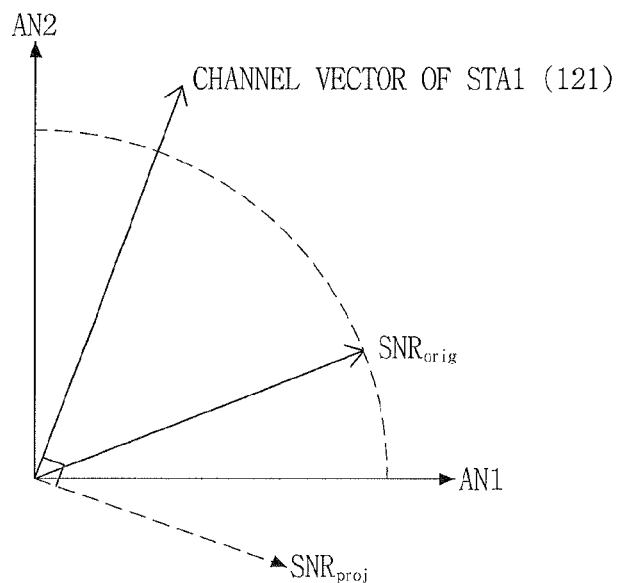
FIG. 4 is a conceptual diagram illustrating a method of calculating a SNR reduction value of the second station shown in FIGS. 1A and 2A.

FIG. 4 is a conceptual diagram illustrating a method of calculating a SNR reduction value of the second station 122 shown in FIG. 1A and FIG. 2A.

Referring to FIG. 3 and FIG. 4, X-axis and Y-axis may represent the first antenna AN1 and the second antenna AN2 of the AP 110, respectively. The SNR of the signal received from the second station 122 may be reduced after being projected to the orthogonal direction with respect to the channel vector $h_1$ of the first station 121.

Figures 5A, 5B:
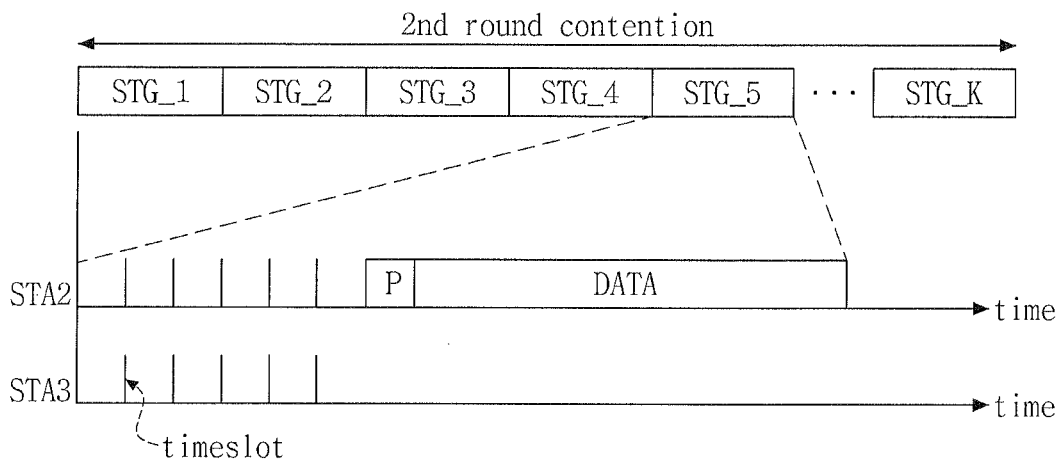
FIG. 5A is a detailed view for the second round contention of FIG. 3.
FIG. 5B is a table illustrating threshold ranges according to the stages shown in FIG. 5A.

FIG. 5A is a detailed view for the second round contention process shown in FIG. 3. FIG. 5B is a table illustrating threshold ranges according to the stages shown in FIG. 5A.

Referring to FIG. 1A, FIG. 5A, and FIG. 5B, it is assumed that the first station 121 to the third station 123 are located in a distance access to the AP 110. It is assumed that the first station 121 wins in the first round contention and first access to the AP 110.

The first station 121 may transmit the preamble P and the channel information CH to the AP 110, the second station 122, and third station 123. The second station 122 and third station 123 may receive the preamble P and the channel information CH of the first station 121. The channel information may be a channel vector between the first station 121 and the AP 110.

The second station 122 may calculate a SNR reduction value ΔSNR2 of the second station 122 by using the channel information of the second station 122 and the channel information CH of the first station 121. The second station 122 may compare the SNR reduction value ΔSNR2 of the second station 122 with a threshold TH range. The third station 123 may calculate the SNR reduction value ΔSNR3 of the third station 123 by using the channel information of the third station 123 and the channel information CH of the first station 121. The third station 123 may compare the SNR reduction value ΔSNR3 of the third station 123 with the threshold TH range.

The threshold TH range may be set to have different ranges according to the stages. For example, in a first stage STG_1, the threshold range may be 0 to 0.1. In a second stage STG_2, the threshold range may be 0.1 to 0.2. In a third stage STG_3, the threshold range may be 0.2 to 0.3. In a fourth stage STG_4, the threshold range may be 0.3 to 0.4. In a fifth stage STG_5, the threshold range may be 0.4 to 0.5.

For example, when the SNR reduction value ΔSNR2 of the second station 122 is 0.45 and the SNR reduction value ΔSNR3 of the third station 123 is 0.56, the SNR reduction value ΔSNR2 of the second station 122 may fall within the threshold range corresponding to fifth stage STG_5 and the SNR reduction value ΔSNR3 of the third station 122 may be larger than the threshold range corresponding to the fifth stage STG_5. The second station 122 may participate in a contention at the fifth stage STG_5 and the third station 123 might not participate in the contention at the fifth stage or any other stages in the second round contention. The second station 122 may communicate with the AP 110 together with the first station 121.

For example, when the SNR reduction value ΔSNR2 of the second station 122 is 0.45 and the SNR reduction value ΔSNR3 of the third station 123 is 0.46, both the SNR reduction values of the second station 122 and the third station 123 may fall within the threshold range corresponding to the fifth stage STG_5. Both the second station 122 and third station may participate in the second round contention at the fifth stage STG_5.

Figure 6:
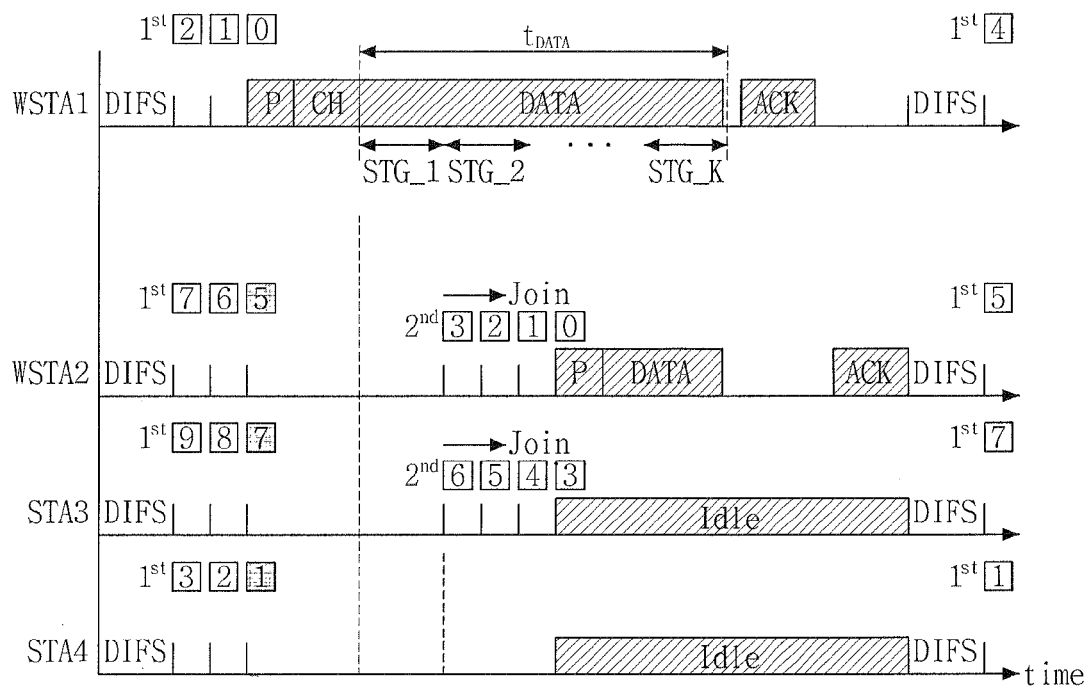
FIG. 6 is a conceptual diagram illustrating a method of operating the WLAN system shown in FIG. 1A.

FIG. 6 is a conceptual diagram illustrating a method of operating the WLAN system shown in FIG. 1A.

Referring to FIG. 1A to FIG. 6, a method of operating the WLAN system 100 may include determining a first selected station WSTA1 and determining a second selected station WSTA2. The WSTA may represent a winner station. The first selected station WSTA1 and the second selected station WSTA2 may be determined by contention process. The AP 110 may make no intervention to the contention process.

In the WLAN system 100 according to the present inventive concept, the first round contention process for determining the first selected station WSTA1 may be similar or the same as the contention process by using a distributed coordinate function (DCF) in a WLAN system. For example, a station having the smallest first backoff counter value may win in the first round contention process. The station winning in the first round contention process may be the first station 121 (the first selected station WSTA1) in the WLAN 100 according to the present inventive concept and may start an UL transmission in the first round contention. The $SNR_1$ of the signal of the first station 121 might not be reduced during decoding process. The throughput $R_1$ of the first station 121 may be determined based on $SNR_1=|h_1|^2P/N_o$. The first station 121 may determine a length of a data packet so that a data transmission time is to be $t_{DATA}$ based on the throughput $R_1$ of the first station 121.

The first station 121 may broadcast the channel information CH and the preamble P of the first station 121. The channel information CH of the first station 121 may include channel information for all subcarriers used for transmission. Various technologies for compressing information may be used. The other stations (e.g., the second station 122 to fourth station 124) excluding the first station 121 may receive the channel information CH and may calculate SNR reduction values of the respective other stations when transmitting a data together with the first station 121.

For example, if the second round contention begins when the first station 121 transmits a data, the channel may come to a busy status due to the data transmission from the first station 121. The respective second station 122 to fourth station 124 might not use the carrier sensing through energy level. To solve the problem, the respective second station 122 to fourth station 124 may utilize the carrier sensing by sensing the preamble P broadcasted from the first station 121. The second station 122 to fourth station 124 may sense the preamble P even when the channel is at the busy status. For example, when the first station 121 transmit the preamble P, the second station 122 to fourth station 124 may recognize that a station wins in the contention and they lose in the contention.

The second round contention may include K stages. Each stage may include M timeslots. As an embodiment, the timeslot may have a length of 9 µs. Not all stations of the second station 122 to fourth station 124 may participate in the second round contention. Only stations having the SNR reduction value falling within the threshold range predetermined according to each stage in the second round contention.

For example, the stations participating in the second round contention may have to have the SNR reduction values of the station satisfied Equation 1 for participating in the contention at i-th stage STG_i (1≤i≤K).

$$TH_i,\text{lower} \leq \Delta SNR < TH\_i,\text{upper} \quad \text{[Equation 1]}$$

The respective stations (e.g., the second station 122 to the fourth station 124) may calculate the respective SNR reduction values ΔSNRs by using the channel information of the respective stations and the channel information CH broadcasted by the first station 121. The respective stations may participate in the contention in the i-th stage STG_i when satisfying the condition given by Equation 1.

For example, if there is no station satisfying the condition of Equation 1 for the first stage STG_1, no station may participate in the contention at the first stage STG_1. For example, if the second station 122 and the third station 123 satisfy the condition of Equation 1 may participate in the contention and the fourth station 124 does not satisfy the condition of Equation 1, the second station 122 and the third station may participate in the contention at the second stage STG_2 and the fourth 124 might not participate in the contention.

The first backoff counter values of the second station 122 and the third station 123 may be remained. The second backoff counter values of the second station 122 and the third station 123 may be randomly selected among 0 to [M−1] to be used in the second round contention, where M is the number of timeslots in a stage.

As a result of the second round contention, the second station 122 may become the WSTA2 and may start a second UL transmission. The second station 122 may determine the throughput $R_2$ by considering the SNR reduction value of the second station 122. The second station 122 may determine the throughput $R_2$ based on the $SNR_{proj}$ of the projected signal of the second station 122.

The second station 122 may adjust a data packet length to match the transmission time of the second station 122 with the transmission time of the first station 121. The third station 123 and fourth station 124 which sense a preamble P of the second station 122 may recognize to lose in the contention and may wait until the transmissions end.

If the transmissions end, the AP 110 may sequentially transmit ACK messages to acknowledge the transmission results. A sequence of transmitting the ACK messages may be equal to a sequence of winning in the contentions. After the AP 110 transmits the ACK message, the following contention may be started. The first station 121 may have a new first backoff counter value of 4 because the first station 121 succeeds in the transmission. The other stations (e.g., the second station 122 to the fourth station 124) may remain an original value in the first backoff counter.

If the transmission by the first station 121, WSTA1, in the first round contention is failed, the first station 121 may double the contention window size as done in the DCF. The first station 121 may randomly select the new first backoff counter value. The second station 122, WSTA2, may remain the contention window size to use the current first backoff counter value of the second station 122.

The threshold range predetermined according to the stages and the number of timeslots M in one stage may affect system performance. The number of the total stages K may be determined based on data transmission time $t_{DATA}$ and the number of timeslots M.

The first round contention process will be further explained with reference to FIG. 7A to FIG. 7D. The second round contention process will be further explained with reference to FIG. 8A to FIG. 8E.

FIGS. 7A to 7D are tables illustrating first backoff counter values of the first station 121 to the fourth station 124 varying during the first round contention process shown in FIG. 6. It is assumed that the WLAN system 100 includes the AP 110 and the first station 121 to fourth station 124 which can access to the AP 110.

Referring to FIG. 1A, FIG. 6, and FIG. 7A, when the respective stations access to a wireless media in a contention-based service in 802.11, a distributed inter-frame space (DIFS) may mean a minimum time to wait after a certain station finally uses the wireless media.

In the first round contention, the respective first station 121 to fourth station 124 may randomly select the first backoff counter values. For example, the first station 121 may select 2 as the first backoff counter value. The second station 122 may select 7 as the first backoff counter value. The third station 123 may select 9 as the first backoff counter value. The fourth station 124 may select 3 as the first backoff counter value.

Referring to FIG. 1A, FIG. 6, and FIG. 7B, if one timeslot is progressed, the first backoff counter values of the respective first station 121 to fourth station 124 may be decreased by one. The first backoff counter value of the first station 121 may become 1. The first backoff counter value of the second station 122 may become 6. The first backoff counter value of the third station 123 may become 8. The first backoff counter value of the fourth station 124 may become 2.

Referring to FIG. 1A, FIG. 6, and FIG. 7C, if another timeslot is progressed, the first backoff counter values of the respective first station 121 to fourth station 124 may be decreased by one. The first backoff counter value of the first station 121 may become 0. The first backoff counter value of the second station 122 may become 5. The first backoff counter value of the third station 123 may become 7. The first backoff counter value of the fourth station 124 may become 1.

In the first round contention, a station whose first backoff counter value becomes 0, earlier than other stations, may win in the contention. That is, the first station 121 may become WSTA1.

Referring to FIG. 1A, FIG. 6, and FIG. 7D, if the first station 121 succeeds in the transmission, the first station 121 may randomly select a new first backoff counter value. For example, after the transmission is succeeded, the first station 121 may select 4 as the new first backoff counter value.

The other stations (e.g., the second station 122 to the fourth station 123) may remain the previous first backoff counter value. For example, the first backoff counter value of the second station 122 may be 5. The first backoff counter value of the third station 123 may be 7. The first backoff counter value of the fourth station 124 may be 1.

FIGS. 8A to 8E are tables illustrating a second backoff counter value according to the second round contention process shown in FIG. 6. It is assumed that the WLAN system 100 includes the AP 110 and the first station 121 to fourth station 124 which can access the AP 110. The first station 121 may be selected as a winner station for the first round contention.

Referring to FIG. 1A, FIG. 6, and FIG. 8A, for the second round contention, the respective second station 122 to fourth station 124 may calculate the SNR reduction values. The respective second station 122 to fourth station 124 may compare the respective SNR reduction values with the threshold ranges differently predetermined according to the stages in the second round contention. The respective second station 122 to fourth station 124 may determine the threshold ranges within which the SNR reduction values fall. The respective second station 122 to fourth station 124 may determine the stages to participate in the second round contention from the determined threshold ranges.

For example, if the SNR reduction values of the respective second station 122 and third station 123 correspond to the threshold range of fifth stage STG_5 and the fourth station 124 corresponds to the threshold range of sixth stage STG_6, the respective second station 122 and third station 123 may select the second backoff counter values and participate in the fifth stage STG_5 in the second round contention. The fourth station 124 may wait until the sixth stage STG_6.

For example, the second station 122 may select 3 as the second backoff counter value. The third station 123 may select 6 as the second backoff counter value.

Referring to FIG. 1A, FIG. 6, and FIG. 8B, if one timeslot is progressed, the second backoff counter values of the respective second station 122 and third station 123 may be decreased by one. The second backoff counter value of the second station 122 may become 2. The second backoff counter value of the third station 123 may become 5.

Referring to FIG. 1A, FIG. 6, and FIG. 8C, if another timeslot following the one timeslot is progressed (e.g., two timeslots are progressed after the second station 122 and the third station 123 select the second backoff counter values), the second backoff counter values of the respective second station 122 and third station 123 may be decreased by one. The second backoff counter value of the second station 122 may become 1. The second backoff counter value of the third station 123 may become 4.

Referring to FIG. 1A, FIG. 6, and FIG. 8D, if additional one timeslot following the another timeslot (e.g., three timeslots are progressed after the second station 122 and the third station 123 select the second backoff counter values) is progressed, the second backoff counter values of the respective second station 122 and third station 123 may be decreased by one. The second backoff counter value of the second station 122 may become 0. The second backoff counter value of the third station 123 may become 3.

In the second round contention, a station whose second backoff counter value first becomes 0, earlier than the third station 123, may win in the contention. That is, the second station 122 may become WSTA2.

Referring to FIG. 1A, FIG. 6, and FIG. 8E, after the second round contention ends, the second backoff counter value may be initialized. For example, the second backoff counter values of the respective first station 121 to fourth station 124 may be set to 0.

Figure 9:
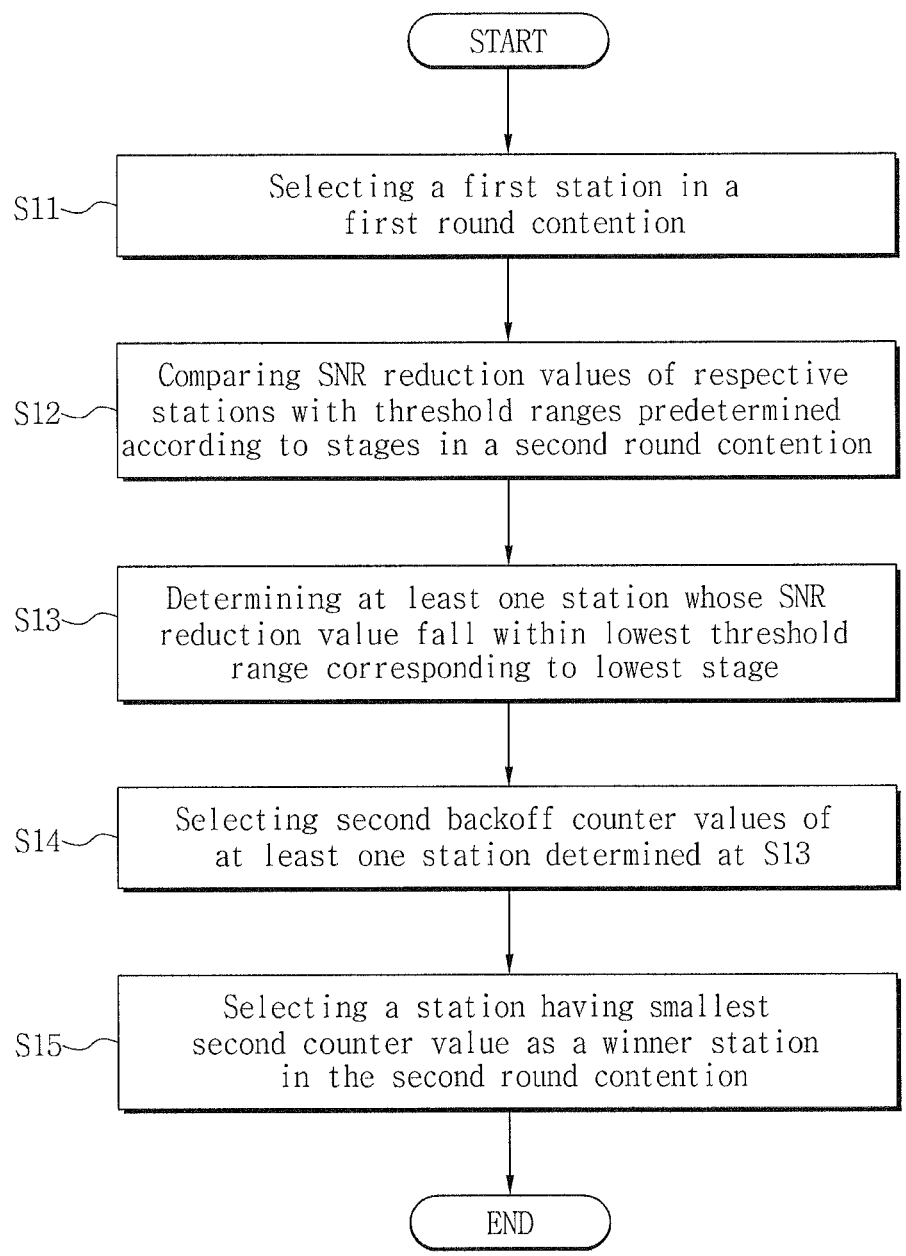
FIG. 9 is a flowchart illustrating a method of operating the WLAN system shown in FIG. 6 according to an embodiment of the present inventive concept.

FIG. 9 is a flowchart illustrating a method of operating the WLAN system shown in FIG. 6.

Referring to FIG. 6 to FIG. 9, the respective first station 121 to fourth station 124 may participate in the first round contention. In step S11, the first station 121 may be selected through the first round contention process.

In step S12, the respective second station 122 to fourth station 124 may compare the SNR reduction values of the respective second station 122 to fourth station 124 with the threshold ranges differently predetermined according to the stages in the second round contention.

In step S13, the respective second station 122 to fourth station 124 may determine, based on the compared result given by the step S12, at least one station whose SNR reduction value falls within a lowest threshold range corresponding to a lowest stage. For example, if the SNR reduction values of the respective second station 122, third station 123, and fourth station 124 are 0.45 and 0.46, and 0.56, respectively, the SNR reduction values of the respective second station 122 and third station 123 may correspond to the threshold range of fifth stage STG_5 and the SNR reduction value of the fourth station 124 may correspond to the threshold range of sixth stage STG_6. The lowest threshold range within which the SNR reduction values of the respective second station 122 to fourth station 124 fall may be 0.4 to 0.5 of FIG. 5B. The lowest stage corresponding to the lowest threshold range may be the fifth stage STG_5. The stations participating in the second round contention at the fifth stage may be the second station 122 and the third station 123.

In step S14, the stations (e.g., the second station 122 and the third station 123 participating in the second round contention at the fifth stage may randomly select respective second backoff counter values. The respective second station 122 and third station 123

In step S15, a station (e.g., the second station 122) having a smallest second backoff counter value among the stations (e.g., the second station 122 and the third station 123) participating in the second round contention may be selected. For example, the second backoff counter values of the stations participating in the second round contention may be reduced by one whenever a timeslot is progressed until one of the second backoff counter values of the stations participating in the second round contention becomes 0. The station whose second backoff counter value becomes 0 may be selected as a winner station, WST2, for the second round contention.

Figure 10:
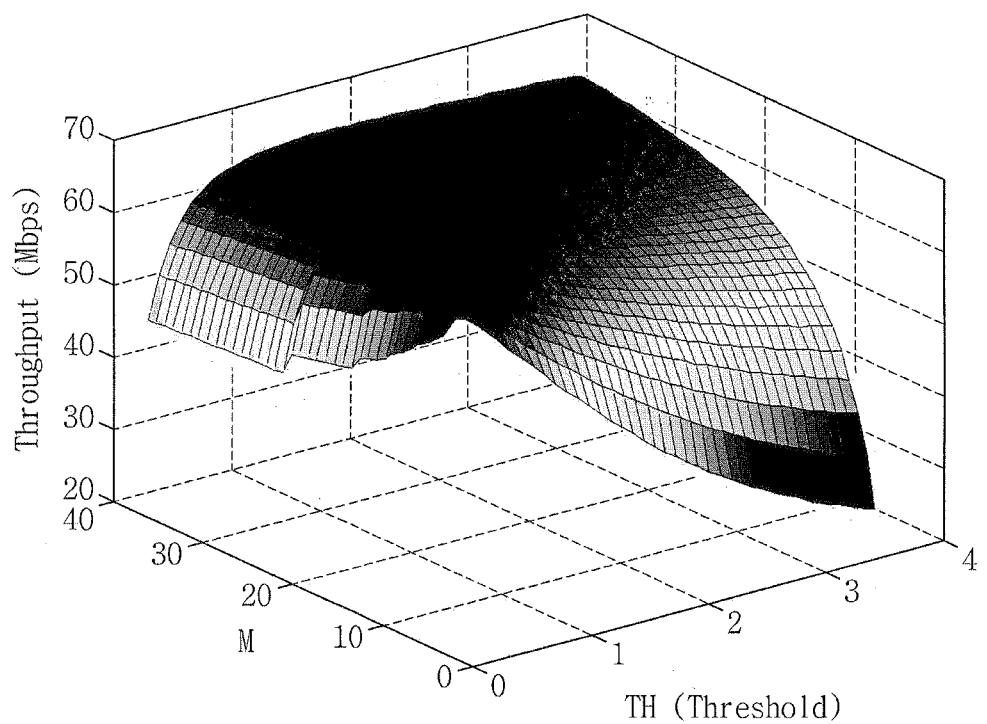
FIG. 10 is a graph illustrating the throughput of the WLAN system according to a threshold and the number of timeslot.

FIG. 10 is a graph illustrating a throughput of the WLAN system 100 according to an embodiment of the inventive concept as functions of a threshold and the number of timeslots in a stage. The threshold may be an upper bound of the SNR reduction value for participating in the second round contention. For example, if each stage in the second round contention consist of K stages, the threshold may be the upper bound of the threshold range in the K-th stage. Referring to FIG. 10, it is assumed that the total number of stations is 20, and a distance between the respective stations and the AP 110 is set to be 20 m. The throughput of the WLAN system 100 may vary depending on the threshold TH and the number of timeslots M. The throughput of the WLAN system 100 may be affected by an optimized threshold TH, the number of timslots M, or a channel status of a station.

Figure 11:
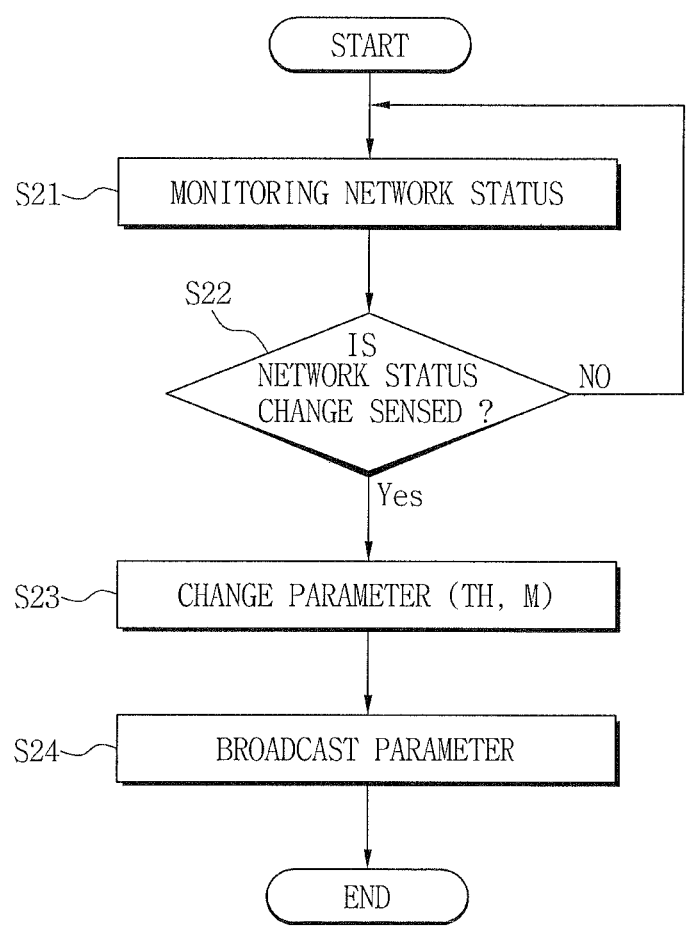
FIG. 11 is a flowchart illustrating a method of operating the WLAN system according to an embodiment of the inventive concept.

FIG. 11 is a block diagram illustrating a method of operating the WLAN system according to an embodiment of the inventive concept.

Referring to FIG. 1A and FIG. 11, in step S21, the AP 110 may monitor a network status. The network status may be the number of stations and the channel status of the respective stations.

In step S22, the AP 110 may determine whether the network status is changed. If the network status is changed, step S23 may be performed. If not, step S21 may be performed.

In step S23, the AP 110 may change a parameter. The parameter may include the threshold and the number of timeslots M. The threshold may be an upper bound of the SNR reduction value for participating in the second round contention.

In step S24, the AP 110 may broadcast the parameter to the stations which can access to the AP 110. The broadcasted parameter may be the optimized threshold TH and the number of timeslots M in the stage to stations.

The AP 110 may insert the parameter such as the optimized threshold TH or the number of timeslots M into a beacon frame or may define and use a new frame for transmitting the parameter.

Figure 12:
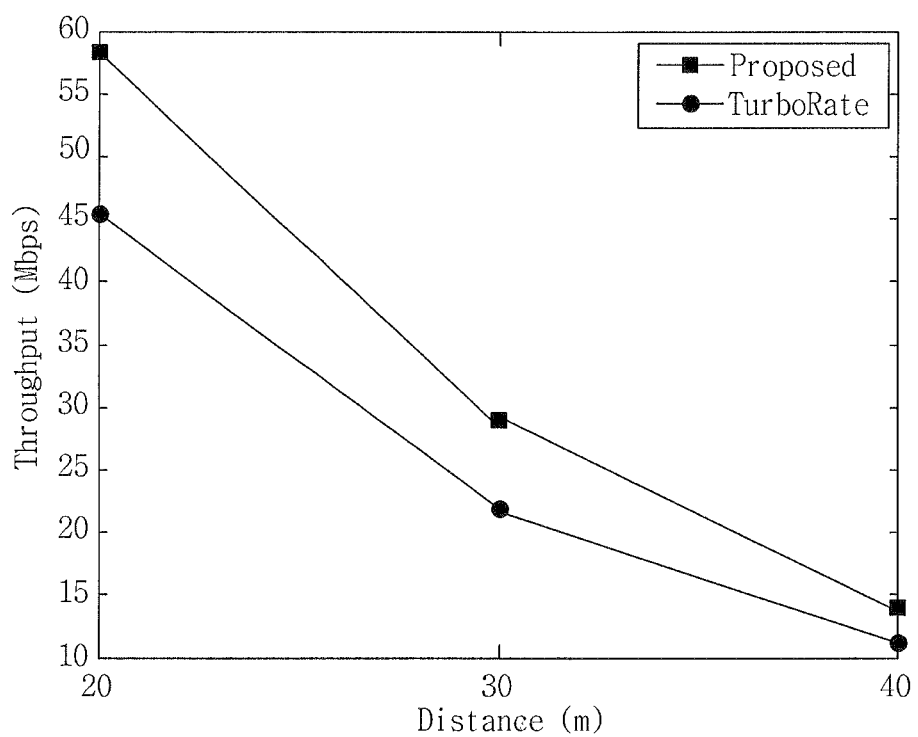
FIG. 12 is a graph illustrating throughput of the WLAN system according to an embodiment of the inventive concept.

FIG. 12 is a graph illustrating a simulation result of the WLAN system 100 according to an embodiment of the inventive concept.

Performance of the WLAN system 100 according to an embodiment of the present inventive concept may be compared with that of WLAN with MU-MIMO based on Turbo-Rate. A total of 40 stations may be set to locate at the same distance from the AP 110. The throughput of the WLAN system 100 may be observed as a function of the distance between the respective stations and the AP 110. The distance may be gradually varied to 20 m, 30 m, and 40 m.

The throughput of the WLAN system 100 according to an embodiment of the inventive concept may be higher than that of the WLAN based on TurboRate. The performance of the WLAN system 100 may be improved by 25~30% approximately.

The WLAN system 100 according to an embodiment of the inventive concept may increase the throughput of the WLAN system in UL MU-MIMO mode.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A method of operating a wireless local area network system comprising an access point supporting uplink multiple user multiple input multiple output mode, the method comprising:
   selecting a first station;
   receiving, by a second station, a channel information from the selected first station;
   calculating, by the second station, a SNR reduction value by using the channel information; and
   selecting the second station based on the SNR reduction value,
   wherein the selecting of the first station comprises:
   selecting respective first backoff counter values by the respective first station and second station; and
   selecting the first station based on the selected first backoff counter value,
   wherein the selecting of the first station based on the first backoff counter value comprises:
   reducing the respective first backoff counter values of the respective first station and second station by one whenever a timeslot is progressed until one of the first backoff counter values of the respective first station and second station is 0; and
   selecting the station whose first backoff counter value is 0 as the first station.

2. The method according to claim 1, wherein the selecting of the first station comprises executing carrier sense multiple access.

3. The method according to claim 1, wherein the receiving, by the second station, of the channel information from the selected first station comprises receiving a channel vector information of the first station.

4. The method according to claim 1, wherein the calculating, by the second station, of the SNR reduction value by using the channel information comprises calculating a difference between an original SNR before a channel vector of the second station is projected to the orthogonal direction with respect to a channel vector of the first station and a projected SNR after the channel vector of the second station is projected to the orthogonal direction with respect to the channel vector of the first station.

5. The method according to claim 1, wherein the selecting of the second station comprises:
   comparing respective SNR reduction values of respective stations including the second station, capable of accessing to the access point, with respective threshold ranges predefined differently according to respective stages in a contention round; determining, based on the compared result, at least one station including the second station whose SNR reduction value falls within a lowest threshold range corresponding to a lowest stage;
   selecting respective second backoff counter values by the at least one station including the second station in the determined lowest stage; and
   selecting, based on the selected second backoff counter value, the second station from among the at least one station including the second station.

6. The method according to claim 5, wherein the selecting of the second station based on the selected second backoff counter value comprises:
   reducing the second backoff counter values of the at least one station including the second station by one whenever a timeslot is progressed until one of the second backoff counter values of the at least one station including the second station is 0; and selecting the station whose second backoff counter value is 0 as the second station.

7. The method according to claim 6, further comprising: monitoring a network status; determining whether the network status is changed;
changing a parameter based on the determined result whether the network status is changed; and
broadcasting the changed parameter to at least one station capable of accessing the access point.

8. The method according to claim 7, wherein the network status is the number of the stations capable of accessing to the access point or channel status of the stations capable of accessing to the access point.

9. The method according to claim 7, wherein the changing of the parameter comprises changing information related to the threshold predetermined differently according to the stages and the number of the timeslots in the stage.

10. A wireless local area network (WLAN) system, comprising:
an access point configured to support uplink multiple user multiple input multiple output mode;
a first station selected for uplink transmission in a first round contention; and
a second station configured to calculate a SNR reduction value by using a channel vector of the first station and to participate selectively in another round contention,
wherein the access point comprises at least two antennas, and the access point is configured to monitor a network status, change a parameter when the network status is changed, and broadcast the changed parameter,
wherein the SNR reduction value is a difference between an original SNR before a channel vector of the second station is projected to the orthogonal direction with respect to a channel vector of the first station and a projected SNR after the channel vector of the second station is projected to the orthogonal direction with respect to the channel vector of the first station.

11. The WLAN system according to claim 10, wherein the second station determines a throughput of the second station by considering the SNR reduction value of the second station.

12. The WLAN system according to claim 10, wherein the second station adjusts a data packet length of the second station to match a transmission time of the first station with a transmission time of the second station.

13. A method for operating a wireless local area network system supporting uplink multiple user multiple input multiple output mode comprising:
receiving, by a first station, a channel information of a second station selected in a first round contention;
calculating, by the first station receiving the channel information, a SNR reduction value by using the channel information;
participating, by the first station, in a second round contention based on the SNR reduction value,
wherein the SNR reduction value is a difference between an original SNR before a channel vector of the first station is projected to the orthogonal direction with respect to a channel vector of the second station and a projected SNR after the channel vector of the first station is projected to the orthogonal direction with respect to the channel vector of the second station.

14. The method according to claim 13, further comprises selecting the first station based on a first backoff counter value of the first station.

15. The method according to claim 13, wherein the channel information is a channel vector information of the second station.

16. The method according to claim 13, wherein the first round contention is carrier sense multiple access, and the second round contention is carrier counting multiple access.

* * * * *